United States Patent
Simcik et al.

(10) Patent No.: US 10,124,989 B2
(45) Date of Patent: Nov. 13, 2018

(54) ELEVATOR CAR ARRIVAL INDICATION ON A MOBILE DEVICE

(71) Applicant: OTIS ELEVATOR COMPANY, Farmington, CT (US)

(72) Inventors: Paul A. Simcik, Southington, CT (US); Kelly Martin Dubois, Unionville, CT (US); Emily Baldi, East Hartford, CT (US); Sheryl Brothers, Wethersfield, CT (US); Yew H. Leong, Simsbury, CT (US); Harrison Daniels, Simsbury, CT (US)

(73) Assignee: OTIS ELEVATOR COMPLANY, Farmington, CT (US)

( * ) Notice: Subject to any disclaimer, the term of this patent is extended or adjusted under 35 U.S.C. 154(b) by 0 days.

(21) Appl. No.: 15/337,718

(22) Filed: Oct. 28, 2016

(65) Prior Publication Data
US 2018/0118510 A1     May 3, 2018

(51) Int. Cl.
| | |
|---|---|
| *B66B 1/16* | (2006.01) |
| *B66B 1/46* | (2006.01) |
| *G06F 3/0484* | (2013.01) |
| *H04W 88/02* | (2009.01) |
| *G06F 3/0481* | (2013.01) |
| *G06F 3/0482* | (2013.01) |

(52) U.S. Cl.
CPC ............ *B66B 1/468* (2013.01); *G06F 3/0484* (2013.01); *B66B 2201/4653* (2013.01); *G06F 3/0482* (2013.01); *G06F 3/04817* (2013.01); *H04W 88/02* (2013.01)

(58) Field of Classification Search
CPC ......... B66B 3/00; B66B 1/3415; B66B 3/006; B66B 1/468; B66B 3/002; B66B 2201/4653; B66B 2201/211; B66B 1/3461
See application file for complete search history.

(56) References Cited

U.S. PATENT DOCUMENTS

| | | | |
|---|---|---|---|
| 6,550,587 B1 | 4/2003 | Yuasa et al. | |
| 7,036,635 B2 | 5/2006 | Rintala | |
| 7,377,364 B2 | 5/2008 | Tyni et al. | |
| (Continued) | | | |

FOREIGN PATENT DOCUMENTS

| | | |
|---|---|---|
| CN | 204400372 U | 6/2015 |
| DE | 202016003883 U1 | 7/2016 |
| (Continued) | | |

OTHER PUBLICATIONS

Chinese design abstract CN 303839802, Wang Mingqu, "Belt of—ElevatorFloor graphical user interface display panel", published Sep. 7, 2016. 4pgs.
(Continued)

*Primary Examiner* — Marlon Fletcher
(74) *Attorney, Agent, or Firm* — Cantor Colburn LLP

(57) ABSTRACT

A method for presenting an estimated elevator car arrival time, the method comprising: receiving an elevator call at a mobile device; obtaining the estimated elevator car arrival time in response to the elevator call; and generating a user interface depicting the estimated elevator car arrival time, the user interface depicting the estimated elevator car arrival time including a dynamic component that changes appearance in response to the estimated elevator car arrival time.

20 Claims, 12 Drawing Sheets

(56) References Cited

U.S. PATENT DOCUMENTS

| | | | |
|---|---|---|---|
| 7,445,090 B2 | 11/2008 | Bodmer et al. | |
| 7,562,746 B2 | 7/2009 | Yoshikawa et al. | |
| 8,069,957 B2 | 12/2011 | Miyajima et al. | |
| 8,744,754 B2 * | 6/2014 | Kappeler | B66B 1/468 187/391 |
| 2004/0060777 A1 * | 4/2004 | Takeuchi | B66B 1/14 187/391 |
| 2007/0151809 A1 * | 7/2007 | Tyni | B66B 1/468 187/391 |
| 2009/0159374 A1 | 6/2009 | Sorsa et al. | |
| 2013/0153339 A1 * | 6/2013 | Sarjanen | B66B 1/468 187/382 |
| 2014/0339023 A1 | 11/2014 | Friedli | |
| 2014/0358410 A1 | 12/2014 | Khoe et al. | |
| 2016/0090271 A1 * | 3/2016 | Silvennoinen | B66B 1/468 187/387 |
| 2016/0122157 A1 * | 5/2016 | Keser | B66B 1/468 187/388 |
| 2016/0221791 A1 | 8/2016 | Berryhill | |
| 2016/0251199 A1 * | 9/2016 | Kronkvist | B66B 1/468 187/381 |

FOREIGN PATENT DOCUMENTS

| | | |
|---|---|---|
| EP | 0403232 A2 | 12/1990 |
| EP | 3210921 A1 | 8/2017 |
| WO | 2006097568 A1 | 9/2006 |
| WO | 2015180771 A1 | 12/2015 |

OTHER PUBLICATIONS

Chinese design abstract CN 303839806, Wang Mingqu, "Belt elevator control box of the graphical user interface display panel", published Sep. 7, 2016, 4 pgs.

Chinese design abstract, CN 303564306, Li Sijin, "Take a graphical interface of mobile phone" published Jan. 20, 2016, 7 pgs.

Chinese design abstract, CN 303772087, Tian Xuanzi, "Elevator display is used for graphical user interface" published Aug. 3, 2016, 20 pgs.

Chinese design abstract, CN 303772088, Tian Xuanzi, "Elevator display is used for graphical user interface" published Aug. 3, 2016, 20 pgs.

Chinese design abstract, CN 303804550, Pan Jinmin and Chen Gongchao, "Display panel of elevator", published Aug. 17, 2016, 4 pgs.

Japanese design abstract, JP D1546005, Yamasaki Akira and Nagata Ayako, "Elevator for display" published Feb. 19, 2016, 5 pgs.

Japanese design abstract, JP D1546006, Yamasaki Akira and Nagata Ayako, "Elevator for display" published Feb. 19, 2016, 5 pgs.

WO design abstract, WO D086159-001, Gyu-Chual, Kim et al., "Animated graphical user interface" published Oct. 9, 2016, 12 pgs.

WO design abstract, WO D088063-007, Oh, Byungchuk et al., "Graphical user interfaces" published Jan. 21, 2016, 10 pgs.

European Search Report for application EP 17198891.8, dated Apr. 26, 2018, 11 pages.

Kone Corporation, "Kone RemoteCall", Dec. 31, 2013, available at: https://www.kone.com.tr/Images/factsheet-kone-remotecall_tcm115-18641.pdf, 2 pages.

* cited by examiner

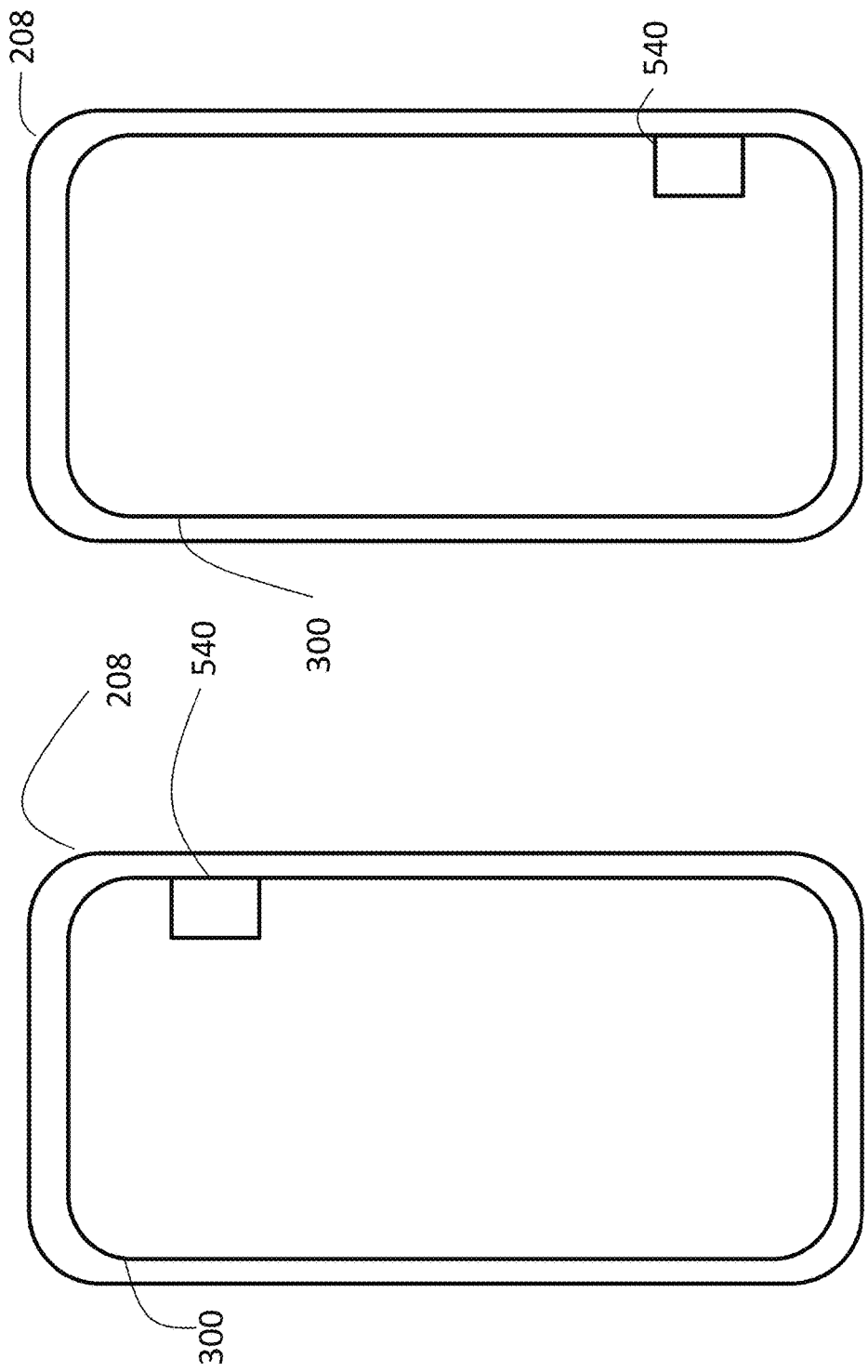

ELEVATOR CAR ARRIVAL INDICATION ON A MOBILE DEVICE

BACKGROUND

Existing elevator systems allow a user to submit an elevator call (e.g., a hall call or a destination call) using their own mobile device (e.g., a smartphone). Users of elevator systems often desire to know the arrival time of their assigned elevator car. It can be difficult to precisely indicate an elevator car arrival time. As more elevator demand is entered, elevator assignments change, which can further affect the elevator car arrival time. This makes displaying an accurate elevator car arrival time difficult.

BRIEF SUMMARY

According to one embodiment, a method for presenting an estimated elevator car arrival time incudes receiving an elevator call at a mobile device; obtaining the estimated elevator car arrival time in response to the elevator call; and generating a user interface depicting the estimated elevator car arrival time, the user interface depicting the estimated elevator car arrival time including a dynamic component that changes appearance in response to the estimated elevator car arrival time.

In addition to one or more of the features described above, or as an alternative, further embodiments may include wherein the elevator call comprises a hall call.

In addition to one or more of the features described above, or as an alternative, further embodiments may include wherein the elevator call comprises a destination call.

In addition to one or more of the features described above, or as an alternative, further embodiments may include generating on the user interface an elevator car arrival indicator upon determining the elevator car has arrived at a starting floor.

In addition to one or more of the features described above, or as an alternative, further embodiments may include determining an elevator car assignment in response to the elevator call.

In addition to one or more of the features described above, or as an alternative, further embodiments may include wherein determining the elevator car has arrived at the starting floor comprises receiving a message that the elevator car has arrived at the starting floor.

In addition to one or more of the features described above, or as an alternative, further embodiments may include wherein determining the elevator car has arrived at the starting floor comprises determining that a timeout period has expired since receiving the elevator call.

In addition to one or more of the features described above, or as an alternative, further embodiments may include wherein the elevator car arrival indicator includes the elevator car assignment.

In addition to one or more of the features described above, or as an alternative, further embodiments may include wherein the dynamic component changes size in response to the estimated elevator car arrival time.

In addition to one or more of the features described above, or as an alternative, further embodiments may include wherein the dynamic component changes color in response to the estimated elevator car arrival time.

In addition to one or more of the features described above, or as an alternative, further embodiments may include wherein the dynamic component changes position in response to the estimated elevator car arrival time.

In addition to one or more of the features described above, or as an alternative, further embodiments may include wherein the dynamic component comprises an alphanumeric dynamic component.

In addition to one or more of the features described above, or as an alternative, further embodiments may include wherein the dynamic component comprises a graphical dynamic component.

In addition to one or more of the features described above, or as an alternative, further embodiments may include determining if the estimated elevator car arrival time has changed by more than a threshold time; when the estimated elevator car arrival time has changed by more than a threshold time, updating the user interface depicting the estimated elevator car arrival time in response to an updated estimated elevator car arrival time, the dynamic component changing appearance in response to the updated estimated elevator car arrival time.

In addition to one or more of the features described above, or as an alternative, further embodiments may include wherein the threshold time is a predetermined time value.

In addition to one or more of the features described above, or as an alternative, further embodiments may include wherein the threshold time is determined from the estimated elevator car arrival time.

In addition to one or more of the features described above, or as an alternative, further embodiments may include wherein the dynamic component changes appearance at a rate dependent on the estimated elevator car arrival time.

In addition to one or more of the features described above, or as an alternative, further embodiments may include wherein the rate decreases in response to an increase in the estimated elevator car arrival time.

In addition to one or more of the features described above, or as an alternative, further embodiments may include wherein the dynamic component comprises a graphical representation of an elevator car, wherein movement of the graphical representation of an elevator car corresponds to physical motion of an elevator car.

In addition to one or more of the features described above, or as an alternative, further embodiments may include wherein the position of the graphical representation of the elevator car is proportional to the current floor of the elevator car in a building.

In addition to one or more of the features described above, or as an alternative, further embodiments may include wherein the graphical representation of the elevator car includes a status of the elevator car doors.

According to another embodiment, a mobile device includes a processor; a memory comprising computer-executable instructions that, when executed by the processor, cause the processor to perform operations, the operations including receiving an elevator call at a mobile device; obtaining an estimated elevator car arrival time in response to the elevator call; and generating a user interface depicting the estimated elevator car arrival time, the user interface depicting the estimated elevator car arrival time including a dynamic component that changes appearance in response to the estimated elevator car arrival time.

According to another embodiment, a computer program product tangibly embodied on a computer readable medium, the computer program product including instructions that, when executed by a processor, cause the processor to perform operations including receiving an elevator call at a mobile device; obtaining an estimated elevator car arrival time in response to the elevator call; and generating a user interface depicting the estimated elevator car arrival time, the user interface depicting the estimated elevator car arrival time including a dynamic component that changes appearance in response to the estimated elevator car arrival time.

Technical effects of embodiments include the ability to provide a user interface with an indication of an estimated elevator car arrival time. The user interface includes a dynamic component that changes appearance in response to the estimated elevator car arrival time.

BRIEF DESCRIPTION OF THE DRAWINGS

The present disclosure is illustrated by way of example and not limited in the accompanying figures in which like reference numerals indicate similar elements.

FIGS. 9-13 depict a user interface on a mobile device in an example embodiments.

DETAILED DESCRIPTION

Figure 1:
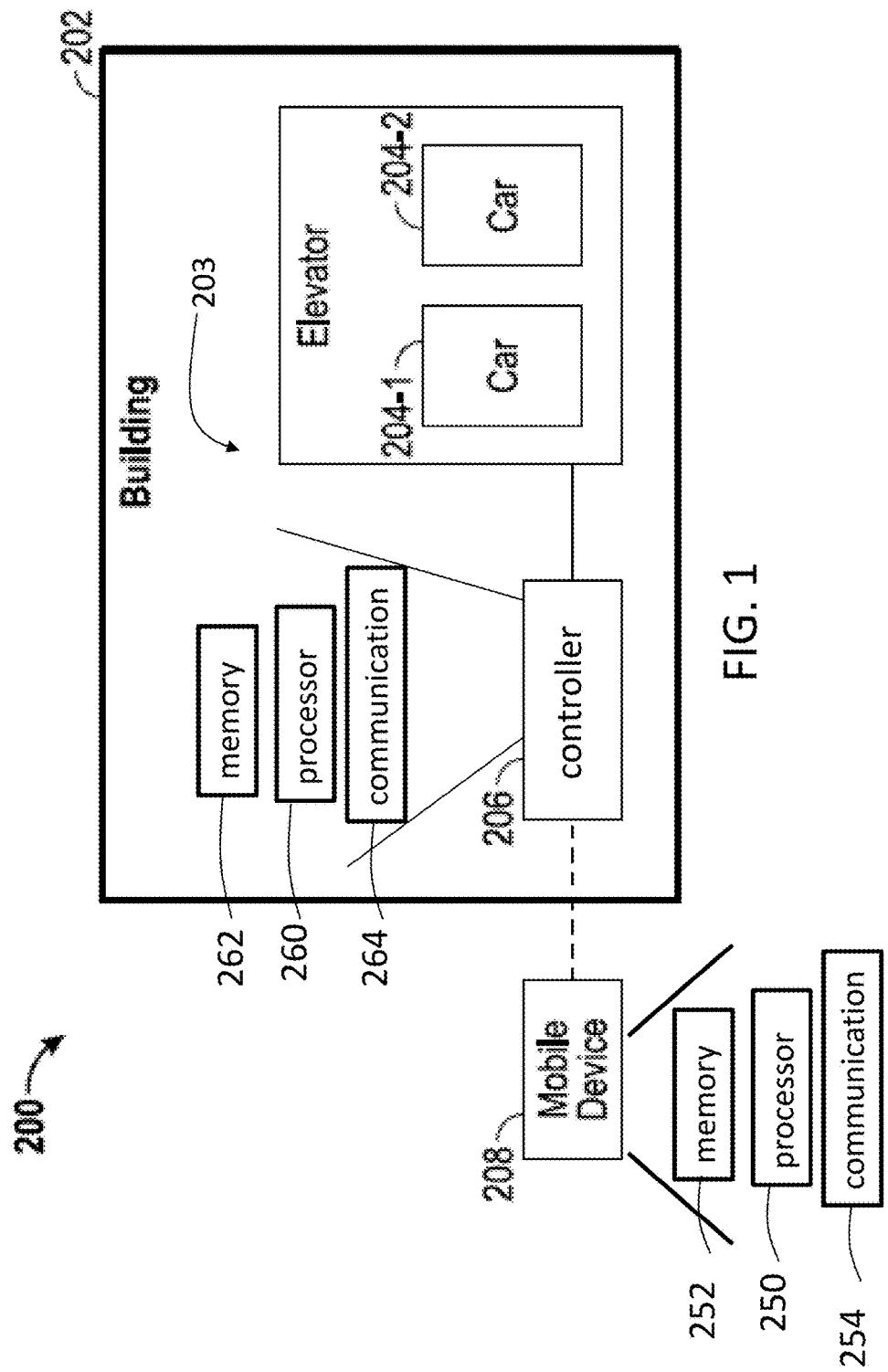
FIG. 1 depicts a system in an example embodiment.

FIG. 1 depicts a system 200 in an example embodiment. The system 200 includes an elevator system 203 installed at a building 202. In some embodiments, the building 202 may be an office building or a collection of office buildings that may or may not be physically located near each other. The building 202 may include any number of floors. Persons entering the building 202 may enter at a lobby floor, and may go to a destination floor via one or more conveyance devices, such as an elevator system 203.

The elevator system 203 may include one or more computing devices, such as a controller 206. The controller 206 may be configured to control dispatching operations for one or more elevator cars (e.g., elevator cars 204-1, 204-2) associated with the elevator system 203. It is understood that the elevator system 203 may utilize more than one controller 206, and that each controller may control a group of elevators cars 204-1 and 204-2. Although two elevator cars 204-1 and 204-2 are shown in FIG. 1, it is understood that any number of elevators cars may be used in the elevator system 203. The elevator cars 204-1 and 204-2 may be located in the same hoistway or in different hoistways so as to allow coordination amongst elevator cars 204-1 and 204-2 in different elevator banks serving different floors. It is understood that other components of the elevator system 203 (e.g., drive, counterweight, safeties, etc.) are not depicted for ease of illustration.

Also shown in FIG. 1 is a mobile device 208. The mobile device 208 may include a device that is carried by a person, such as a smart phone, PDA, tablet, etc. The mobile device 208 may include wearable items, such as a smart watch, eyewear, etc. The mobile device 208 may include a processor 250, memory 252 and communication module 254 as shown in FIG. 1. The processor 250 can be any type or combination of computer processors, such as a microprocessor, microcontroller, digital signal processor, application specific integrated circuit, programmable logic device, and/or field programmable gate array. The memory 252 is an example of a non-transitory computer readable storage medium tangibly embodied in the mobile device 208 including executable instructions stored therein, for instance, as firmware. The communication module 254 may implement one or more communication protocols as described in further detail herein.

The controller 206 may include a processor 260, memory 262 and communication module 264 as shown in FIG. 1. The processor 260 can be any type or combination of computer processors, such as a microprocessor, microcontroller, digital signal processor, application specific integrated circuit, programmable logic device, and/or field programmable gate array. The memory 262 is an example of a non-transitory computer readable storage medium tangibly embodied in the controller 206 including executable instructions stored therein, for instance, as firmware. The communication module 264 may implement one or more communication protocols as described in further detail herein.

The mobile device 208 and the controller 206 communicate with one another. For example, the mobile device 208 and the controller 206 may communicate with one another when proximate to one another (e.g., within a threshold distance). The mobile device 208 and the controller 206 may communicate over a wireless network, such as 802.11x (WiFi), short-range radio (Bluetooth), etc. In some embodiments, the controller 206 may include, or be associated with (e.g., communicatively coupled to) a networked element, such as kiosk, beacon, hall call fixture, lantern, bridge, router, network node, etc. The networked element may communicate with the mobile device 208 using one or more communication protocols or standards. For example, the networked element may communicate with the mobile device 208 using near field communications (NFC). In other embodiments, the controller 206 may establish communication with a mobile device 208 that is outside of the building 202. This connection may be established with various technologies including GPS, triangulation, or signal strength detection, by way of non-limiting example. Such technologies that allow early communication will provide users and the systems more time to establish the most efficient passenger flow, and may eliminate the need for a user to stop moving to interact with the system. In example embodiments, the mobile device 208 communicates with the controller 206 over multiple independent wired and/or wireless networks. Embodiments are intended to cover a wide variety of types of communication between the mobile device 208 and controller 206, and embodiments are not limited to the examples provided in this disclosure.

Figure 2:
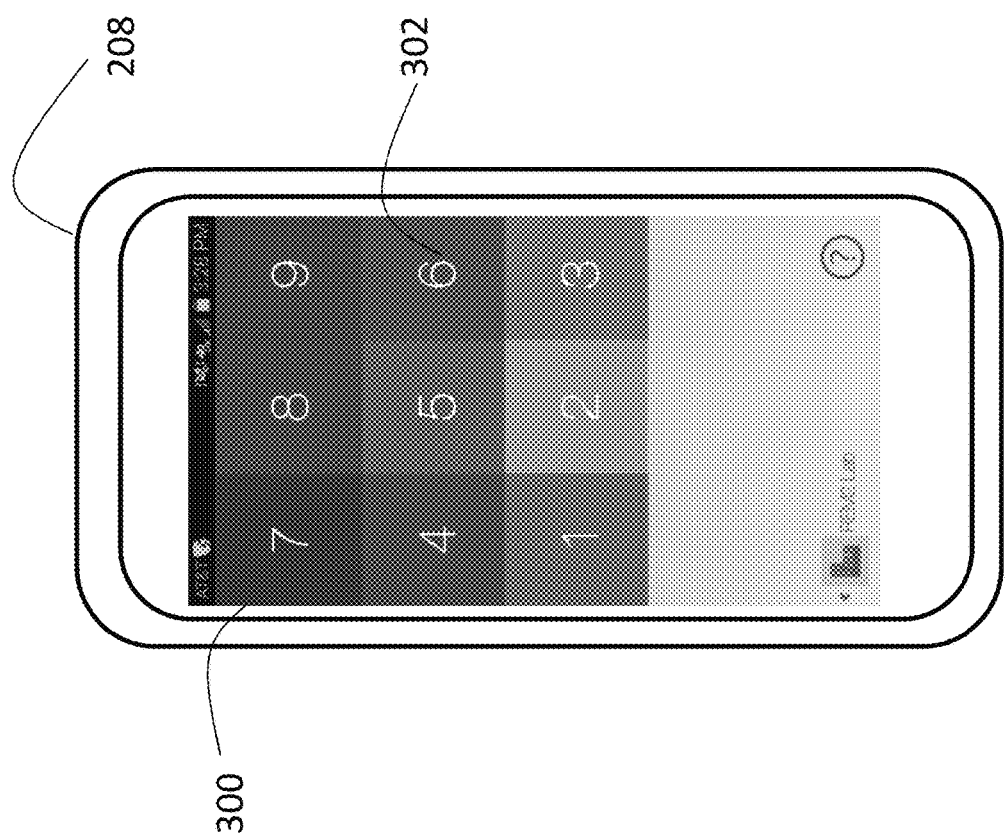
FIGS. 2-7 depict a user interface on a mobile device in an example embodiment.
Figure 3:
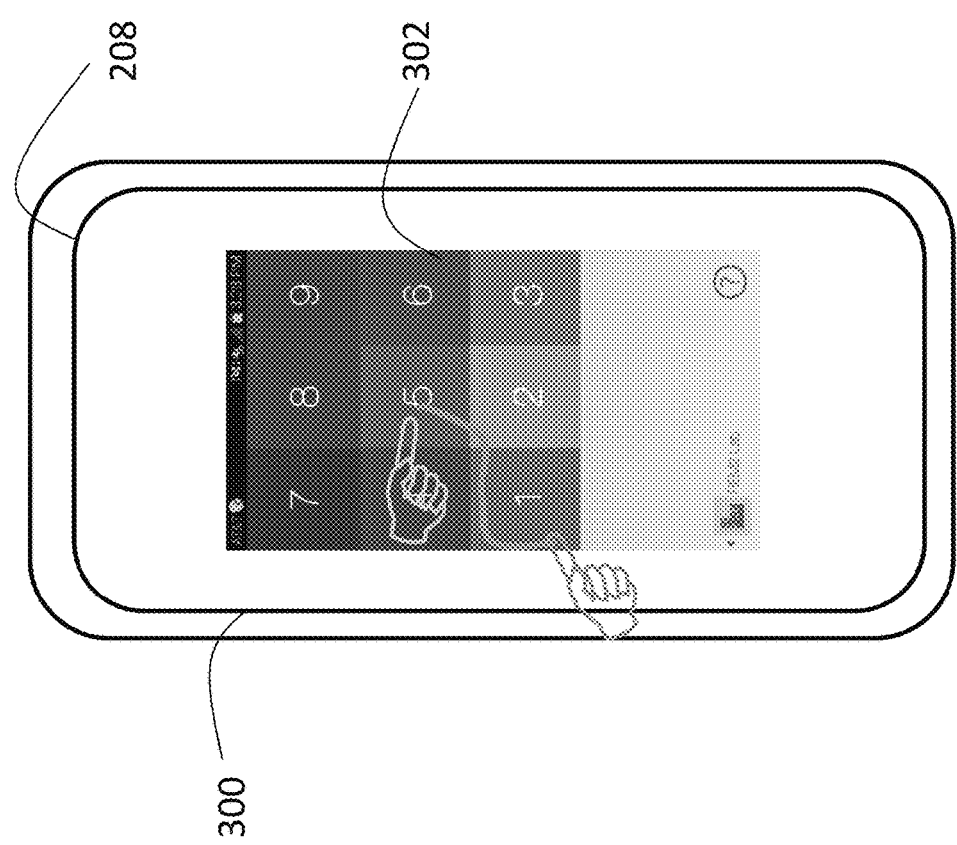

Embodiments generate a user interface on the mobile device 208 depicting an elevator car arrival time. The user interface can adjust in response to delays in the elevator car arrival time. FIGS. 2-7 depict an example user interface 300 on mobile device 208. Referring to FIG. 2, when the mobile device 208 launches an elevator interface application, an elevator call entry screen may be presented as shown in FIG. 2. The elevator call entry screen allows a user to enter an elevator call, such as a hall call or a destination call. A user interface 300 includes a plurality of floor icons 302, each floor icon 302 corresponding to a single floor of the building 202. The user can enter a destination call by selecting a starting floor and ending floor, as shown in FIG. 3. As shown in FIG. 3, the user has selected floor 1 as a starting floor and floor 5 as a destination floor. The particular user interface depicted in FIGS. 2 and 3 is exemplary. Any other desired user interface enabling a user to select a start and destination floor pairing, destination floor, preset elevator call, or any other manner of indicating the desired travel path may be used.

The elevator call is communicated from the mobile device 208 to the controller 206. The controller 206 then determines an estimated elevator car arrival time and an optional elevator car assignment. The controller 206 may use existing elevator dispatch techniques to determine which elevator car 204 (e.g., one of 204-1 or 204-2) will serve the elevator call and also determine the estimated elevator car arrival time based on existing and/or expected elevator demand. The controller 208 then sends the estimated elevator car arrival time and an optional elevator car assignment to the mobile device 208.

Figure 4:
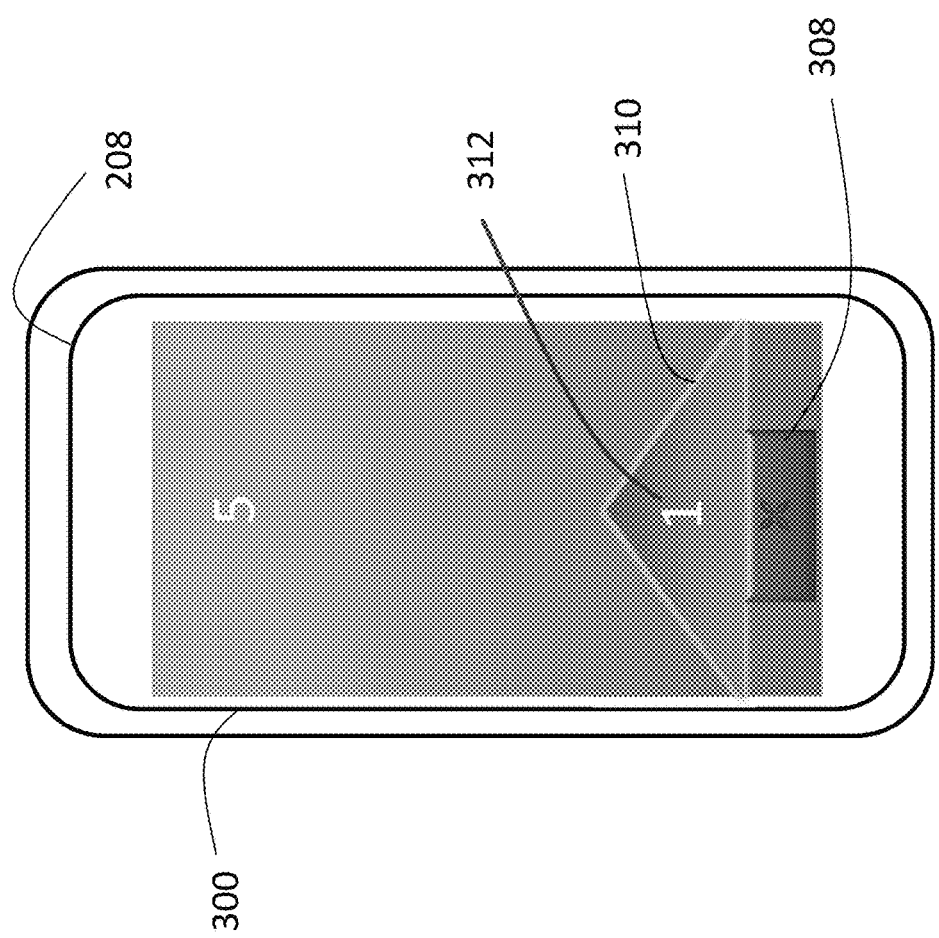

The mobile device 208 then generates a user interface depicting the estimated elevator car arrival time. FIG. 4 depicts an example user interface 300 displaying the estimated elevator car arrival time. The user interface 300 includes at least one dynamic component that changes appearance in response to the estimated elevator car arrival time. The user interface 300 in FIG. 4 includes two dynamic components; a graphical dynamic component 310 and an alphanumeric dynamic component 312. The dynamic components 310 and 312 change appearance as the estimated elevator car arrival time changes. The user interface 300 also includes a graphic cancel icon 308, upon selection of which the elevator call is canceled.

Figure 5:
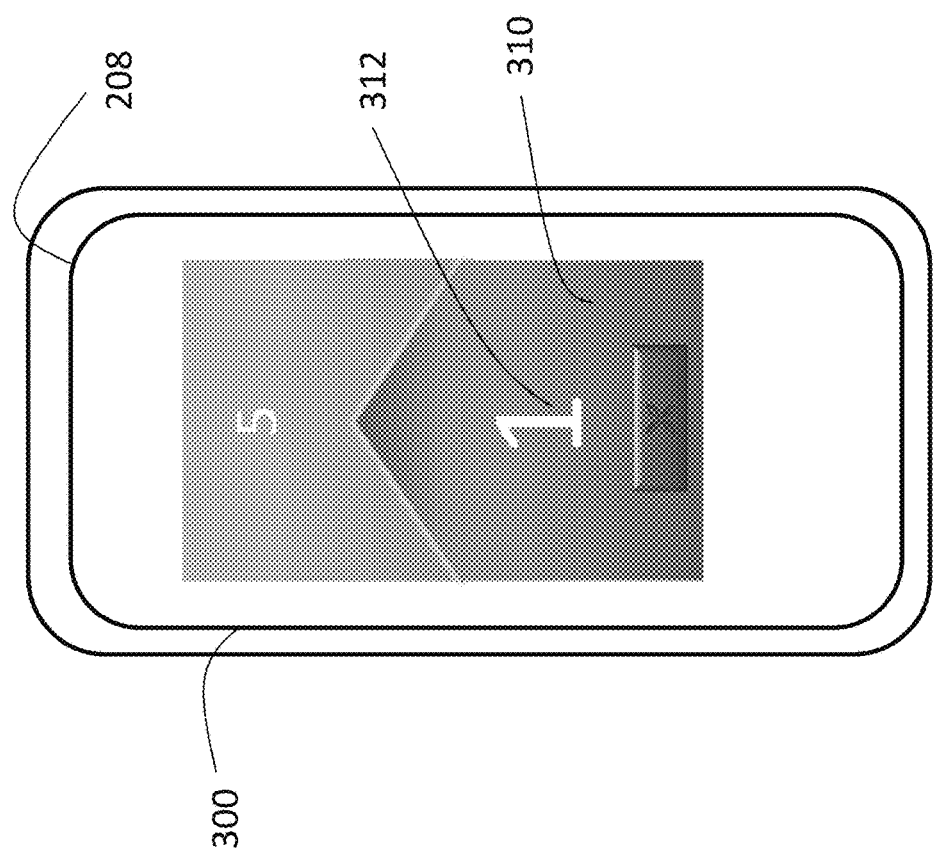
Figure 6:
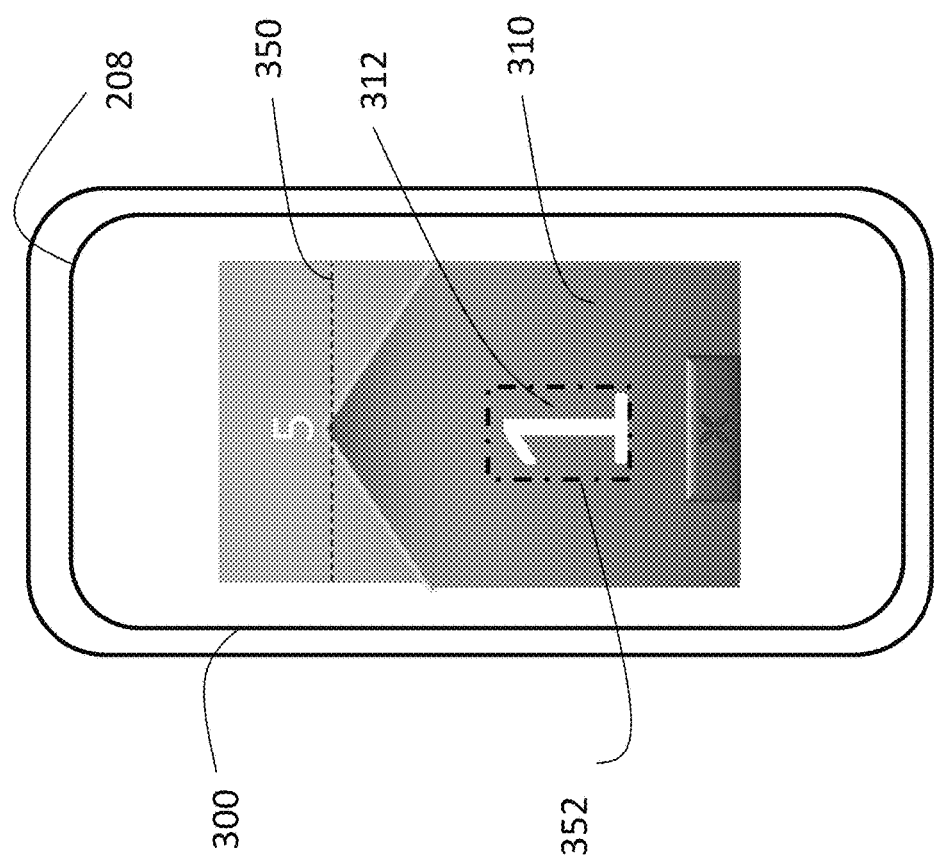

FIGS. 5 and 6 depict the graphical dynamic component 310 and an alphanumeric dynamic component 312 increasing in size as the elevator car 204 travels to the first floor. The rate at which the graphical dynamic component 310 and the alphanumeric dynamic component 312 increase in size is dependent on the estimated elevator car arrival time. For example, if the estimated elevator car arrival time is 10 seconds, the graphical dynamic component 310 and the alphanumeric dynamic component 312 increase in size more rapidly than if the estimated elevator car arrival time was 30 seconds. More generally, the dynamic component(s) in the user interface 300 change appearance at a rate dependent on the estimated elevator car arrival time. As the elevator car 204 approaches the starting floor, the rate of change of the dynamic component(s) may slow.

In the state illustrated in FIG. 6, the graphical dynamic component 310 and the alphanumeric dynamic component 312 have completed transition from a starting state to a final state. This is depicted as graphical dynamic component 310 reaching final state indicator 350 and the alphanumeric dynamic component 312 reaching final state indicator 352. The final state indicators 350 and 352 allow a user to comprehend that the estimated elevator car arrival time is short.

Figure 7:
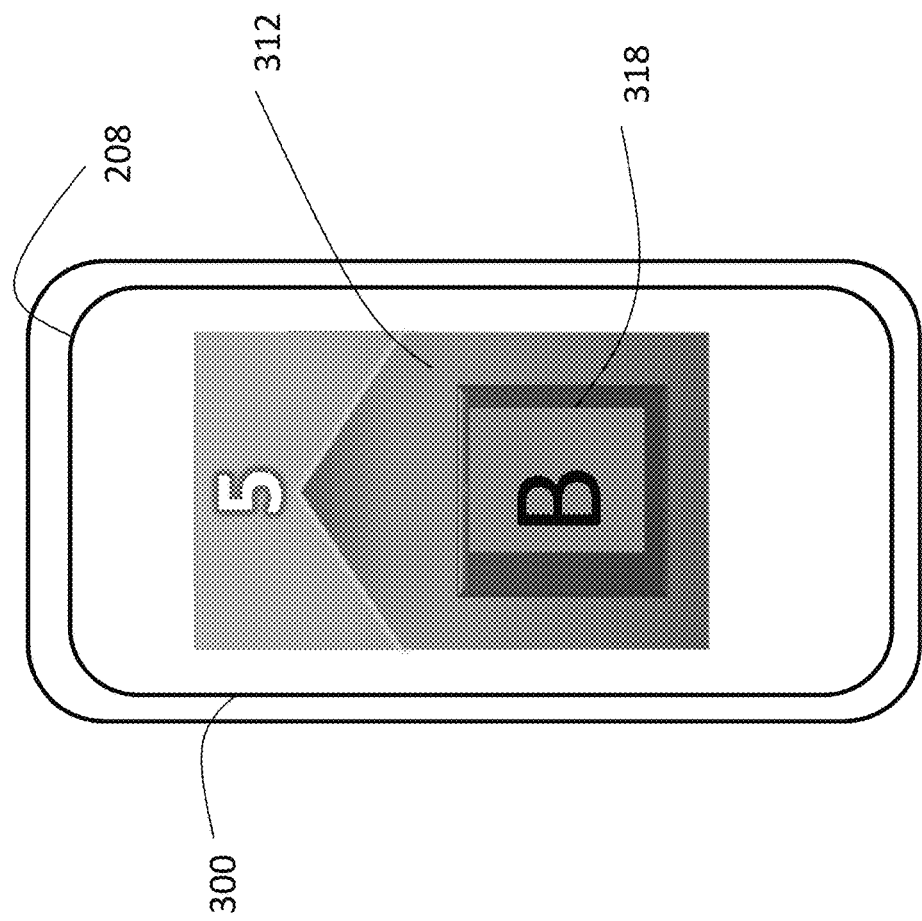

Once the elevator car 204 arrives at the starting floor, the user interface may present an elevator car arrival indicator 318 as shown in FIG. 7. The elevator car arrival indicator 318 may be a symbol indicating that the elevator car 204 assigned to the user in response to the elevator call has arrived. The elevator car arrival indicator 318 may also include an elevator car assignment (e.g., the letter "B" indicating that the user should proceed to car B).

Figure 8:
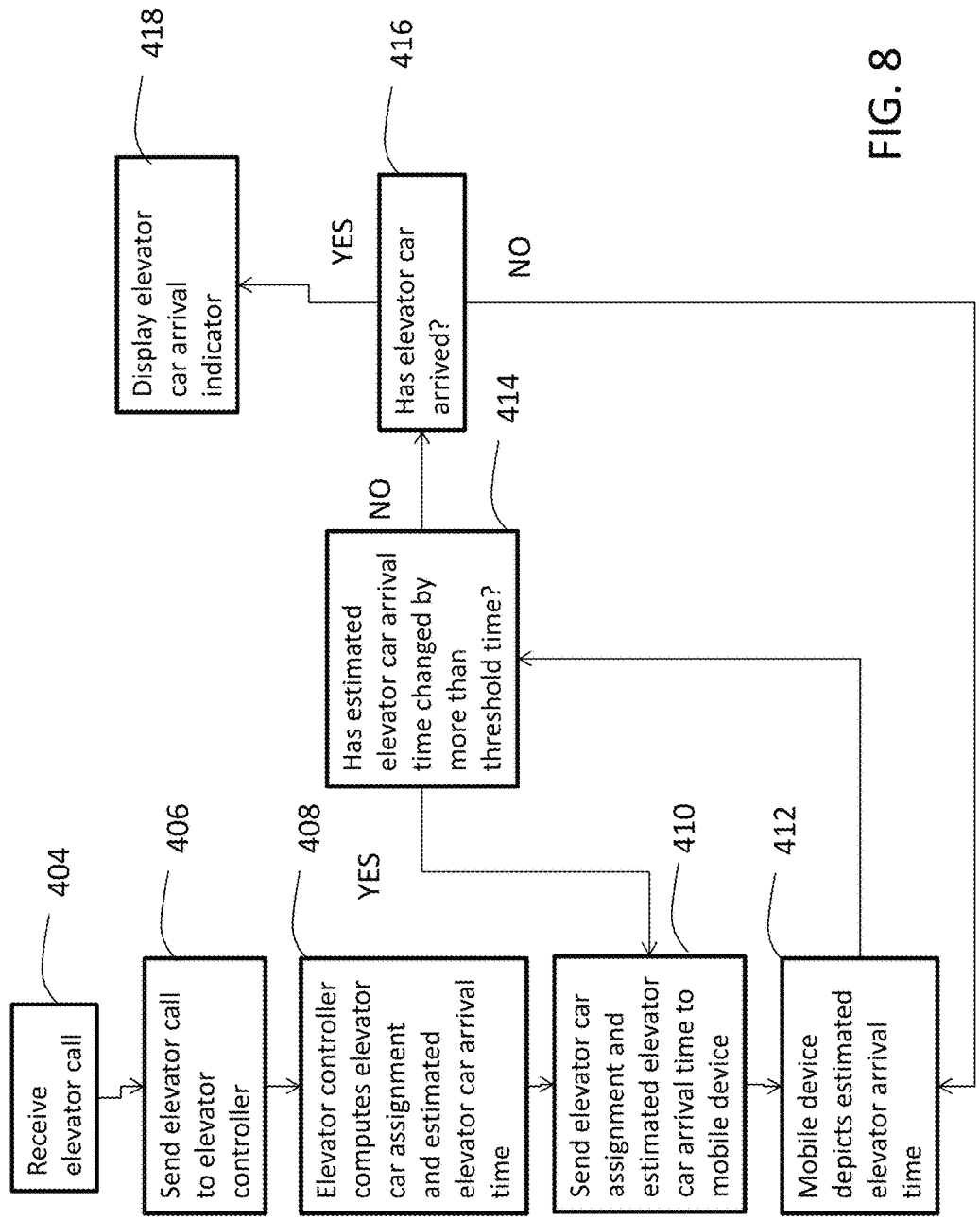
FIG. 8 is a flowchart of a process of depicting an elevator car arrival time in an example embodiment.

FIG. 8 is a flowchart of a process of depicting an estimated elevator car arrival time in an example embodiment. The process begins at 404, where an elevator call is entered on the mobile device 208. The elevator call may be a hall call or a destination call. At 406, the elevator call is provided to controller 206. At 408, the controller 206 determines an estimated elevator car assignment (if necessary) and an estimated elevator car arrival time. The estimated elevator car arrival time may be determined based on existing elevator demand, location of elevator car 204, predicted elevator demand, etc.

At 410, the controller 206 sends the estimated elevator car arrival time and the elevator car assignment (if necessary) to the mobile device 208. At 412, the mobile device 208 generates the user interface to display the estimated elevator car arrival time using at least one dynamic component. For example, referring to FIG. 4, the mobile device 208 generates user interface 300 including the graphical dynamic component 310 and the alphanumeric dynamic component 312. The dynamic components 310 and 312 change appearance at a rate dependent on the estimated elevator car arrival time.

If the estimated elevator car arrival time changes, the rate of change of the appearance of the dynamic components 310 and 312 may also change. For example, if the original estimated elevator car arrival time is increased, the rate of change of the appearance of the dynamic components 310 and 312 may slow to accommodate the increased estimated elevator car arrival time. The rate of change of the appearance of the dynamic components 310 and 312 may also stop completely to accommodate the increased estimated elevator car arrival time. The rate of change of the appearance of the dynamic components 310 and 312 may decrease in response to an increase in the estimated elevator car arrival time.

At 414, the controller 206 determines if the estimated elevator car arrival time has changed by more than a threshold time. The estimated elevator car arrival time may change due to increased demand for the elevator car 204. In one example, the threshold time may be a predetermined time value, such as 15 seconds. In this scenario, if the estimated elevator car arrival time increases by more than 15 seconds, flow proceeds from 414 to 410. In another example, the threshold time may be determined from the initial estimated elevator car arrival time, such as a percentage. In this scenario, if the estimated elevator car arrival time increases by more than 30 percent, flow proceeds from 414 to 410.

If the estimated elevator car arrival time has changed by more than a threshold time at 414, flow proceeds to 410, where an updated estimated elevator car arrival time is sent from the controller 206 to the mobile device 208. The mobile device 208 will then update the user interface 300 to reflect the change in the estimated elevator car arrival time, as shown at 410 and 412. This may entail slowing the rate of change of the dynamic component(s) in response to a longer estimated elevator car arrival time. It should be noted that estimated elevator car arrival time, in one embodiment, indicates the time it will take the elevator car 204 to arrive at the starting floor as measured from the current time. In other words, the estimated elevator car arrival time is a measure of the estimated time from the current time (rather than the time the elevator call was made) to when the elevator car 204 is expected to arrive at the user staring floor. If the estimated elevator car arrival time has not changed by more than a threshold time at 414, flow proceeds to 416 where it is determined if the elevator car 204 has arrived at the starting floor. If the elevator car 204 has not arrived at the starting floor at 416, flow proceeds to 412 where the mobile device 208 continues to generate the user interface.

At 416, the mobile device 208 may determine that the elevator car 204 has arrived in a number of ways. The elevator controller 206 may send a signal to the mobile device 208 when the elevator car 204 arrives at the starting floor. This causes the mobile device 208 to update the user interface 300 to present the elevator car arrival indicator 318 as shown in FIG. 7. The user interface 300 may remain with the graphical dynamic component 310 at the final state indicator 350 and the alphanumeric dynamic component 312 at the final state indicator 352, as shown in FIG. 6, until the elevator controller 206 signals that the elevator car 204 has arrived.

The mobile device 208 may also conclude that the elevator car 204 has arrived after a timeout period has expired (e.g., if 3 minutes have passed since the elevator call was made). After the timeout period has expired, the mobile device 208 assumes that the elevator car 204 has arrived at the starting floor.

If the elevator car 204 has arrived at the starting floor at 416, flow proceeds to 418 where the mobile device 208 generates the elevator car arrival indicator 318 as shown in FIG. 7. The user may select the elevator car arrival indicator 318 to return the user interface to the elevator call entry screen of FIG. 2.

The dynamic components 310 and 312 in FIGS. 4-7 are examples, and it is understood that other dynamic components may be used. In addition to changing size and position, a dynamic component may change color (e.g., from red to green) to indicate the estimated elevator car arrival time. The transition time of the color is dependent on the estimated elevator car arrival time.

Figure 9:
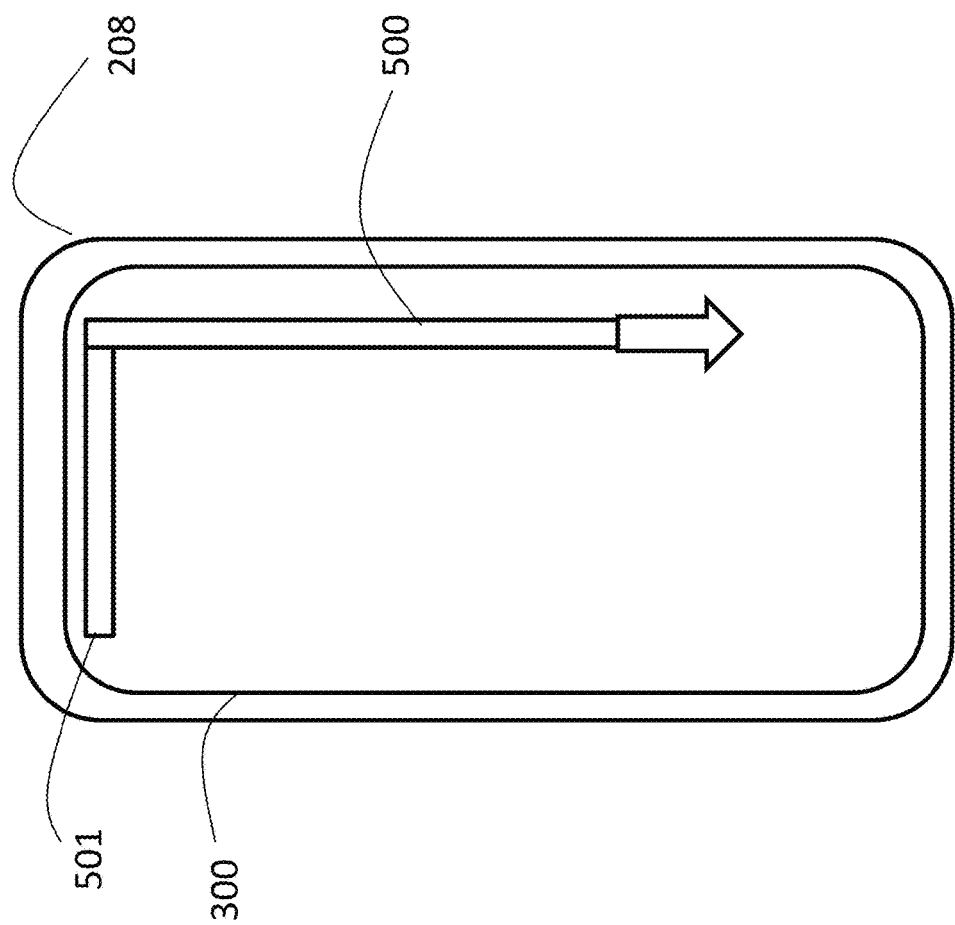

In another embodiment shown in FIG. 9, a dynamic component 500 comprises a border that encircles the outline of the user interface 300 at a rate dependent on the estimated elevator car arrival time. The dynamic component 500 starts at a starting point 501 and travels the outline of the user interface 300. When the dynamic component 500 reaches the starting point 501, the elevator car 204 should have arrived. The starting point 501 serves as the final state indicator.

Figure 10:
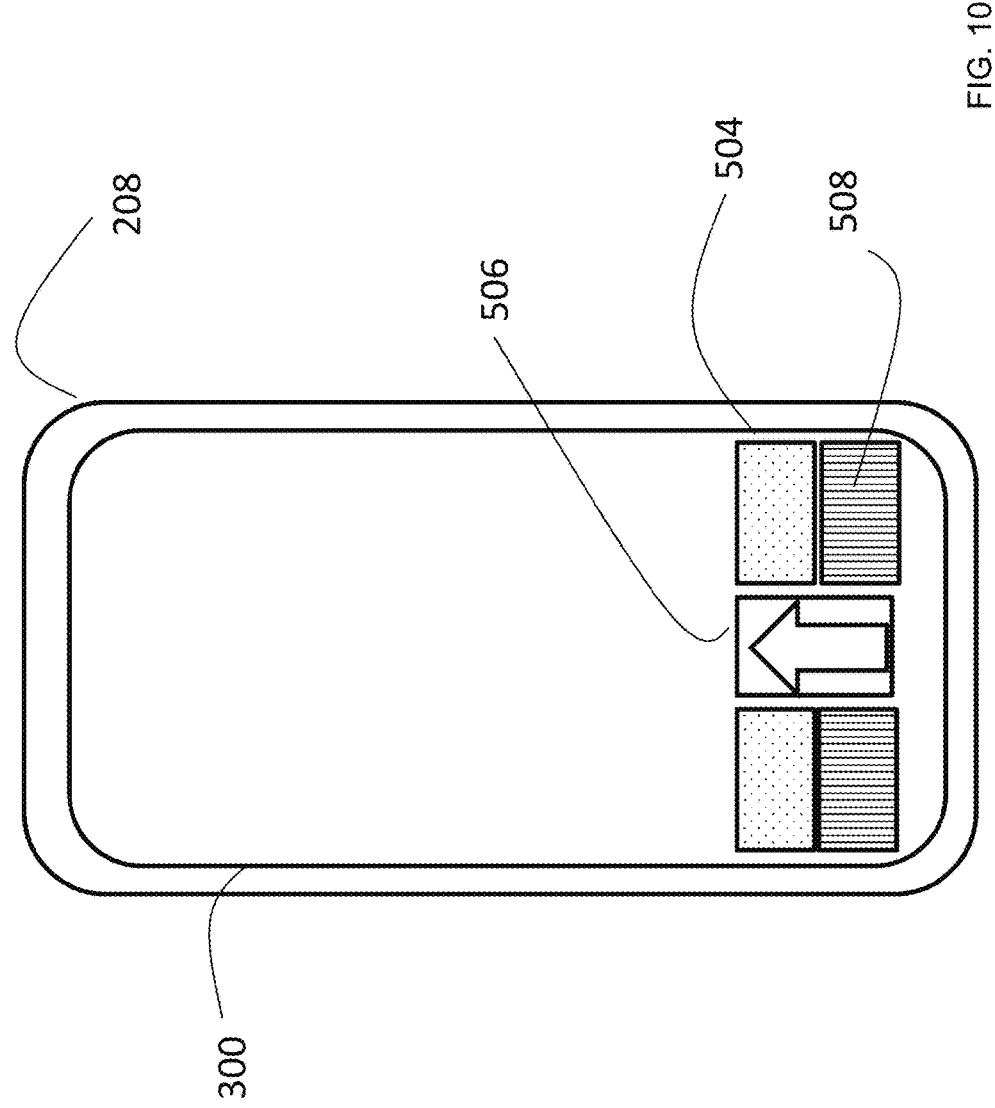

In another embodiment shown in FIG. 10, the dynamic component 504 comprises a graphical depiction of an elevator car 506 traveling past floor images 508 at a rate dependent on the estimated elevator car arrival time. The floors images 508 may be represented using different graphics (e.g., colors, patterns, images) and scroll past the graphical depiction of an elevator car 506 to give the impression motion. As the elevator car 204 approaches the starting floor for the elevator call, the scrolling speed of the floor images 508 slows and eventually stops when elevator car 204 should have arrived.

Figure 11:
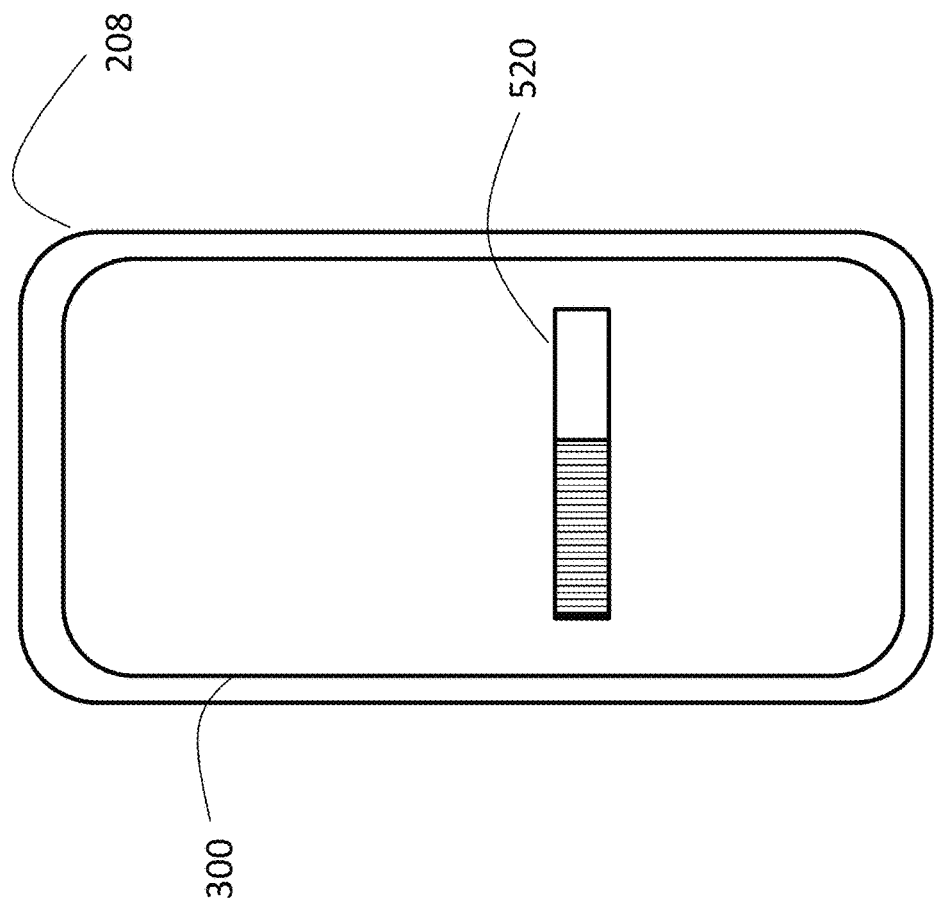

In another embodiment shown in FIG. 11, the dynamic component 520 comprises a loading bar that fills at a rate dependent on the estimated elevator car arrival time. The loading bar 520 starts empty and fills at a rate dependent on the estimated elevator car arrival time. The loading bar 520 is filled when elevator car 204 should have arrived.

In another embodiment shown in FIGS. 12 and 13, the dynamic component 540 comprises a graphical representation of an elevator car 540 that travels along an edge of the user interface 300 at a rate dependent on the estimated elevator car arrival time. The graphical representation of an elevator car 540 may start at the top of the user interface 300 (FIG. 12) and travel downwards at a rate dependent on the estimated elevator car arrival time. As the elevator car 204 approaches the starting floor for the elevator call, the speed of the graphical representation of the elevator car 540 slows and eventually stops at a second position when elevator car 204 should have arrived.

The arrival of elevator car 204 is indicated by the graphical representation of the elevator car 540 reaching the bottom of the user interface 300 (FIG. 13). Movement of the graphical representation of the elevator car 540 may correspond to motion of the physical elevator car 204. For example, the graphical representation of the elevator car 540 can stop when the elevator car 204 stops. The scale of the graphical representation of the elevator car 540 can also be adjusted so that the height of the user interface 300 is proportional to the height of the building or hoistway in which the elevator car 204 travels. The position of the graphical representation of the elevator car 540 may be proportional to the current floor of the elevator car 204 in the building. The graphical representation of the elevator car 540 may also indicate the status of the elevator car doors (e.g., open or closed).

It is understood that the user interfaces in FIGS. 9-12 are just examples, and embodiments may include a variety of user interfaces having one or more dynamic components that change at a rate dependent on the estimated elevator car arrival time.

Embodiments provide a number of benefits in communicating an estimated elevator car arrival time to a user. It is noted that no language is required to describe elevator car motion and the estimated elevator car arrival time. The estimated elevator car arrival time is presented in a relative or fuzzy manner and can be adjusted if the estimated elevator car arrival time is delayed. The mobile device uses an initial estimated elevator car arrival time to create the user interface and does not require constant communication between the controller and the mobile device. If a significant delay occurs, the controller then sends an updated estimated elevator car arrival time to the mobile device.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., a processor, apparatus or system) to perform one or more methodological acts as described herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

What is claimed is:

1. A method for presenting an estimated elevator car arrival time, the method comprising:
   receiving an elevator call at a mobile device;
   obtaining the estimated elevator car arrival time in response to the elevator call; and
   generating a user interface depicting the estimated elevator car arrival time, the user interface depicting the estimated elevator car arrival time including a dynamic component that changes appearance in response to the estimated elevator car arrival time;
   wherein the dynamic component comprises a graphical dynamic component;
   wherein the dynamic component at least one of (i) changes size in response to the estimated elevator car arrival time; (ii) changes color in response to the estimated elevator car arrival time; and (iii) changes position in response to the estimated elevator car arrival time.

2. The method of claim 1 wherein the elevator call comprises a hall call.

3. The method of claim 1 wherein the elevator call comprises a destination call.

4. The method of claim 1 further comprising:
generating on the user interface an elevator car arrival indicator upon determining the elevator car has arrived at a starting floor.

5. The method of claim 4 further comprising:
determining an elevator car assignment in response to the elevator call.

6. The method of claim 4 wherein determining the elevator car has arrived at the starting floor comprises receiving a message that the elevator car has arrived at the starting floor.

7. The method of claim 4 wherein determining the elevator car has arrived at the starting floor comprises determining that a timeout period has expired since receiving the elevator call.

8. The method of claim 5 wherein:
the elevator car arrival indicator includes the elevator car assignment.

9. The method of claim 1 wherein:
the dynamic component comprises an alphanumeric dynamic component.

10. The method of claim 1 wherein:
the dynamic component comprises a graphical dynamic component.

11. The method of claim 1 further comprising:
determining if the estimated elevator car arrival time has changed by more than a threshold time;
when the estimated elevator car arrival time has changed by more than a threshold time, updating the user interface depicting the estimated elevator car arrival time in response to an updated estimated elevator car arrival time, the dynamic component changing appearance in response to the updated estimated elevator car arrival time.

12. The method of claim 11 wherein:
the threshold time is a predetermined time value.

13. The method of claim 11 wherein:
the threshold time is determined from the estimated elevator car arrival time.

14. The method of claim 1 wherein:
the dynamic component changes appearance at a rate dependent on the estimated elevator car arrival time.

15. The method of claim 14 wherein:
the rate decreases in response to an increase in the estimated elevator car arrival time.

16. A method for presenting an estimated elevator car arrival time, the method comprising:
receiving an elevator call at a mobile device;
obtaining the estimated elevator car arrival time in response to the elevator call; and
generating a user interface depicting the estimated elevator car arrival time, the user interface depicting the estimated elevator car arrival time including a dynamic component that changes appearance in response to the estimated elevator car arrival time;
wherein the dynamic component comprises a graphical representation of an elevator car, wherein movement of the graphical representation of an elevator car corresponds to physical motion of an elevator car.

17. The method of claim 16 wherein:
the position of the graphical representation of the elevator car is proportional to the current floor of the elevator car in a building.

18. The method of claim 16 wherein:
the graphical representation of the elevator car includes a status of the elevator car doors.

19. A mobile device comprising:
a processor;
a memory comprising computer-executable instructions that, when executed by the processor, cause the processor to perform operations, the operations comprising:
receiving an elevator call at a mobile device;
obtaining an estimated elevator car arrival time in response to the elevator call; and
generating a user interface depicting the estimated elevator car arrival time, the user interface depicting the estimated elevator car arrival time including a dynamic component that changes appearance in response to the estimated elevator car arrival time;
wherein the dynamic component at least one of (i) changes size in response to the estimated elevator car arrival time; (ii) changes color in response to the estimated elevator car arrival time; and (iii) changes position in response to the estimated elevator car arrival time.

20. A computer program product tangibly embodied on a computer readable medium, the computer program product including instructions that, when executed by a processor, cause the processor to perform operations comprising:
receiving an elevator call at a mobile device;
obtaining an estimated elevator car arrival time in response to the elevator call; and
generating a user interface depicting the estimated elevator car arrival time, the user interface depicting the estimated elevator car arrival time including a dynamic component that changes appearance in response to the estimated elevator car arrival time;
wherein the dynamic component at least one of (i) changes size in response to the estimated elevator car arrival time; (ii) changes color in response to the estimated elevator car arrival time; and (iii) changes position in response to the estimated elevator car arrival time.

* * * * *